United States Patent [19]

Koshimo

[11] Patent Number: 4,972,736
[45] Date of Patent: Nov. 27, 1990

[54] CENTRIFUGAL LOCK-UP CLUTCH FOR A STEPLESS SPEED-CHANGE POWER TRANSMISSION FOR USE IN A VEHICLE

[75] Inventor: Masahiko Koshimo, Osaka, Japan

[73] Assignee: Kabushiki Kaisha Daikin Seisakusho, Osaka, Japan

[21] Appl. No.: 826,042

[22] Filed: Feb. 4, 1986

[30] Foreign Application Priority Data

Feb. 5, 1985 [JP]  Japan .............................. 60-15201[U]

[51] Int. Cl.$^5$ .............................................. F16H 47/00
[52] U.S. Cl. .............................. 74/730.1; 192/105 BA; 192/3.31; 192/3.33
[58] Field of Search ................. 74/689, 730, 731; 192/3.31, 105 BA, 106.2

[56] References Cited

U.S. PATENT DOCUMENTS

| | | | |
|---|---|---|---|
| 2,019,745 | 11/1935 | Swennes | 192/3.26 |
| 2,129,366 | 9/1938 | Swennes | 192/3.25 X |
| 2,627,189 | 2/1953 | McFarland | 192/3.26 X |
| 2,640,572 | 6/1953 | O'Brien | 192/3.26 X |
| 2,882,751 | 4/1959 | Kelley | 192/3.33 X |
| 3,478,621 | 11/1969 | Johnson et al. | 192/3.33 X |
| 3,893,551 | 7/1975 | Ahlen | 192/3.33 |
| 4,004,417 | 1/1977 | Woody et al. | 192/3.31 X |
| 4,049,094 | 9/1977 | Polomski et al. | 192/105 BA |
| 4,113,075 | 9/1978 | Walker | 192/3.31 |
| 4,181,203 | 1/1980 | Malloy | 192/3.31 |
| 4,226,309 | 10/1980 | Silberschlag | 192/3.31 |
| 4,305,493 | 12/1981 | Silberschlag | 192/105 BA |
| 4,383,596 | 5/1983 | Jackel | 192/3.31 |
| 4,478,105 | 10/1984 | Yamamuro et al. | 74/731 X |
| 4,522,290 | 6/1985 | Klink | 192/105 BA |
| 4,549,447 | 10/1985 | Sakakibara | 74/689 |
| 4,601,676 | 7/1986 | Tojima et al. | 192/106.2 |

FOREIGN PATENT DOCUMENTS 2121489 12/1983 United Kingdom ............... 192/3.25

*Primary Examiner*—Dirk Wright
*Attorney, Agent, or Firm*—Armstrong, Nikaido, Marmelstein, Kubovcik and Murray

[57] ABSTRACT

In a stepless speed-change power transmission for vehicle having an acceleration clutch comprising a fluid coupling, a forward/backward change-over mechanism coupled to a rear stage of the acceleration clutch, and a stepless speed changer coupled to a rear stage of the forward/backward change-over mechanism; a centrifugal lock-up clutch for the stepless speed-change power transmission for vehicle characterized by that an approximately disc-like output hub is connected to a turbine hub coupled to a turbine wheel of a fluid coupling fixed to an output shaft of said acceleration clutch, two side plates are so provided as to sandwich both side faces of the output hub, a damper mechanism is interposed between the side plate and the output hub, and a clutch shoe is provided at an outer peripheral portion of the side plate, which is movable in a radial direction of the side plate by means of a centrifugal force and can be freely engaged with or disengaged from an input member inputting a power from an engine.

1 Claim, 3 Drawing Sheets

CENTRIFUGAL LOCK-UP CLUTCH FOR A STEPLESS SPEED-CHANGE POWER TRANSMISSION FOR USE IN A VEHICLE

BACKGROUND OF THE INVENTION

1. Industrial Useful Field

This invention relates to a centrifugal lock-up clutch suitable for an acceleration clutch of a stepless speed-change power transmission for use in a vehicle having a fluid coupling comprising the acceleration clutch, a forward/backward change-over mechanism coupled to a rear stage of the acceleration clutch, and a stepless speed changer coupled to a rear stage of the forward/backward change-over mechanism.

2. Prior Art and Its Problem

A centrifugal lock-up clutch has conventionally been used in an automatic transmission (U.S. Pat. No. 4305493). In this centrifugal lock-up clutch, transmission torque characteristics are changed stepwise according to an engine rotation speed, a slip is produced to decrease a transmission torque in a large load region, and a shock or torsional vibration in changing speed is absorbed conservatively by means of said slip.

For this reason, its construction becomes complicated, its manufacturing becomes difficult and a power of engine is thrown away by the amount of slip so that a vehicle fuel consumption is worsened.

The inventor made the present invention with an intention to develop a centrifugal lock-up clutch suitable for a stepless speed changer which includes no speed-change stage and does not positively generate a slip.

OBJECT OF THE INVENTION

An object of this invention is to provide a centrifugal lock-up clutch for a stepless speed-change power transmission for use in a vehicle, which does not generate a slip in a high-speed rotation, is simple in its construction and cheap in its fabrication cost.

COMPOSITION OF THE INVENTION

(1) Technical measure

In a stepless speed-change power transmission for vehicle having an acceleration clutch comprising a fluid coupling, a forward/backward change-over mechanism coupled to a rear stage of the acceleration clutch, and a stepless speed changer coupled to a rear stage of the forward/backward change-over mechanism; a centrifugal lock-up clutch for the stepless speed-change power transmission for vehicle characterized by that an approximately disc-like output hub is connected to a turbine hub coupled to a turbine wheel of a fluid coupling fixed to an output shaft of said acceleration clutch, two side plates are so provided as to sandwich both side faces of the output hub, a damper mechanism is interposed between the side plate and the output hub, and a clutch shoe is provided at an outer peripheral portion of the side plate, which is movable in a radial direction of the side plate by means of a centrifugal force and can be freely engaged with or disengaged from an input member inputting a power from an engine.

(2) Function

The clutch presses the clutch shoe on the input member by means of the centrifugal force which increases according to an engine rotation speed and locks it up without producing a slip even at a high rotation speed.

DETAILED DESCRIPTION OF THE INVENTION

Embodiment

A stepless speed-change power transmission for use in a vehicle according to the present invention will be described hereunder with reference to FIG. 1 and FIG. 2.

Figure 1:
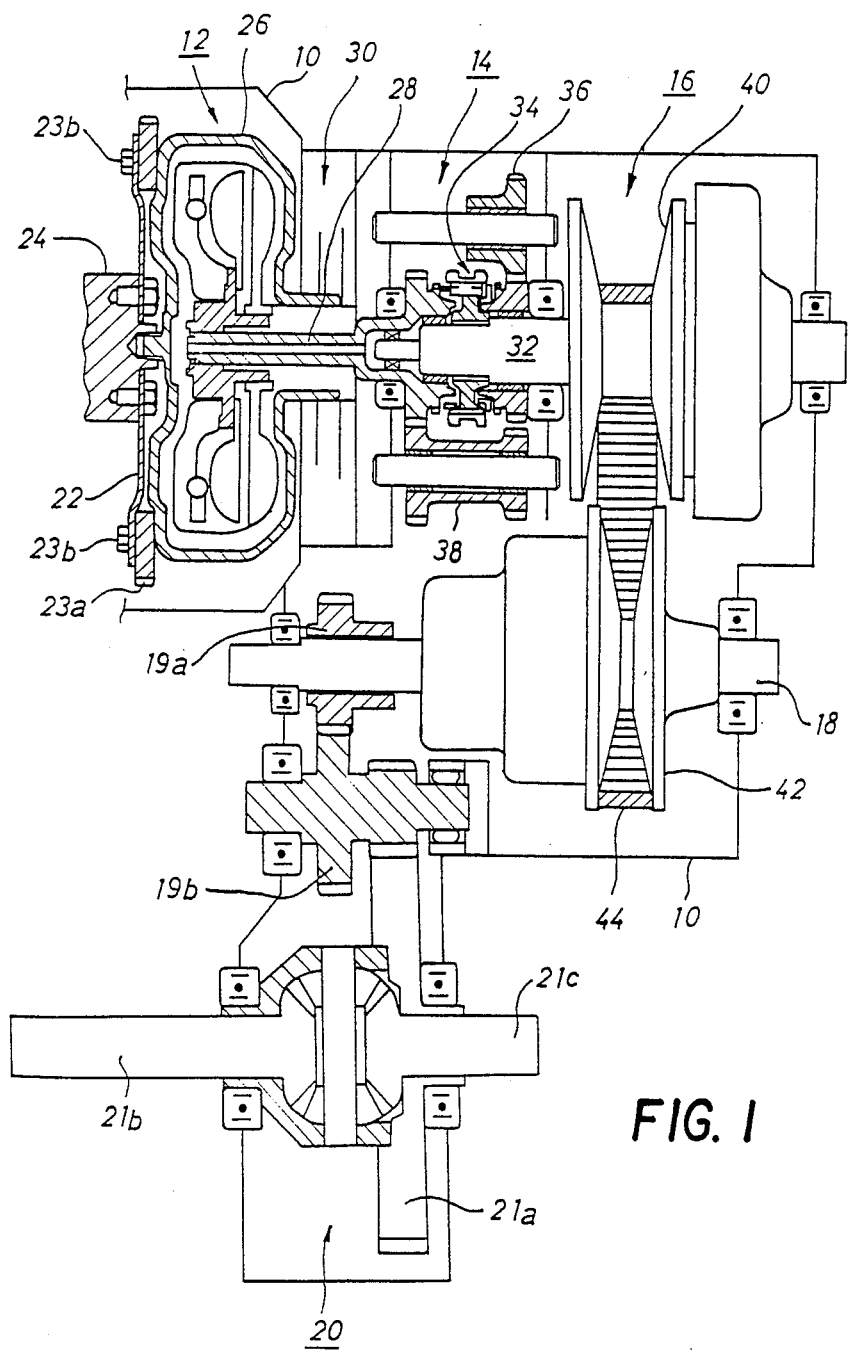
FIG. 1 is a schematic structural view showing a stepless speed-change power transmission according to the present invention.

FIG. 1 shows a general structural view of the entire transmission, and in FIG. 10 is a housing. An acceleration clutch 12 is incorporated in an engine side end portion of the housing 10, and a stepless speed changer 16 is provided at a rear stage of the acceleration clutch 12 through a forward/backward change-over mechanism 14. Further, a power is transmitted from a counter shaft 18 of the stepless speed changer 16 through an output gear 19a and a counter gear 19b to an input gear 21a of a differential mechanism 20, and outputted from the differential mechanism 20 to both left and right axles 21b and 21c.

An engine shaft 24 is coupled to a drive plate 22 of the acceleration clutch 12, and a starter ring a gear 23a is formed at an outer periphery of the drive plate 22 and bolts 23b are fitted thereto. The engine power supplied from the drive plate 22 is transmitted to an external shell element 26 of the acceleration clutch 12, and transmitted intermittently from an output shaft 28 to the forward/backward change-over mechanism 14 by means of the acceleration clutch which will be described later in details. At the same time, the power drives a gear pump 30 disposed between the acceleration clutch 12 and the forward/backward mechanism 14 to control a flow of pressurized oil by means of not-shown well-known control valve (spool valve etc., for example).

The gear pump 30 pumps working oil into the acceleration clutch 12, and said control valve has a function to control a flow of working oil by driver's range-shifting operation. The output shaft 28 is interconnected to a main shaft 32, and a synchronizer 34 of the forward/backward change-over mechanism 14 is provided on the main shaft 32. The synchronizer 34 can arbitrarily select a forward gear 36 or a backward gear 38 by the similar driver's range-shifting operation.

A main pulley 40 of the stepless speed-changer 16 is fixed to the main shaft 32, and a V-belt 44 is wouned around the main pulley 40 and a sub-pulley 42 of the counter shaft 18. The main pulley 40 together with the V-belt 44 have a well-known stepless speed-change function wherein a contact surface radius of the V-belt 44 is adjusted according to a vehicle speed.

Incidentally, the stepless speed changer 16 is not necessarily limited to the construction utilizing the above-mentioned V-belt 44, but may be a stepless speed changer of a troidal type or a traction-drive type.

Next, a detailed construction of the acceleration clutch 12 will be described hereunder with reference to FIG. 2.

Figure 2:
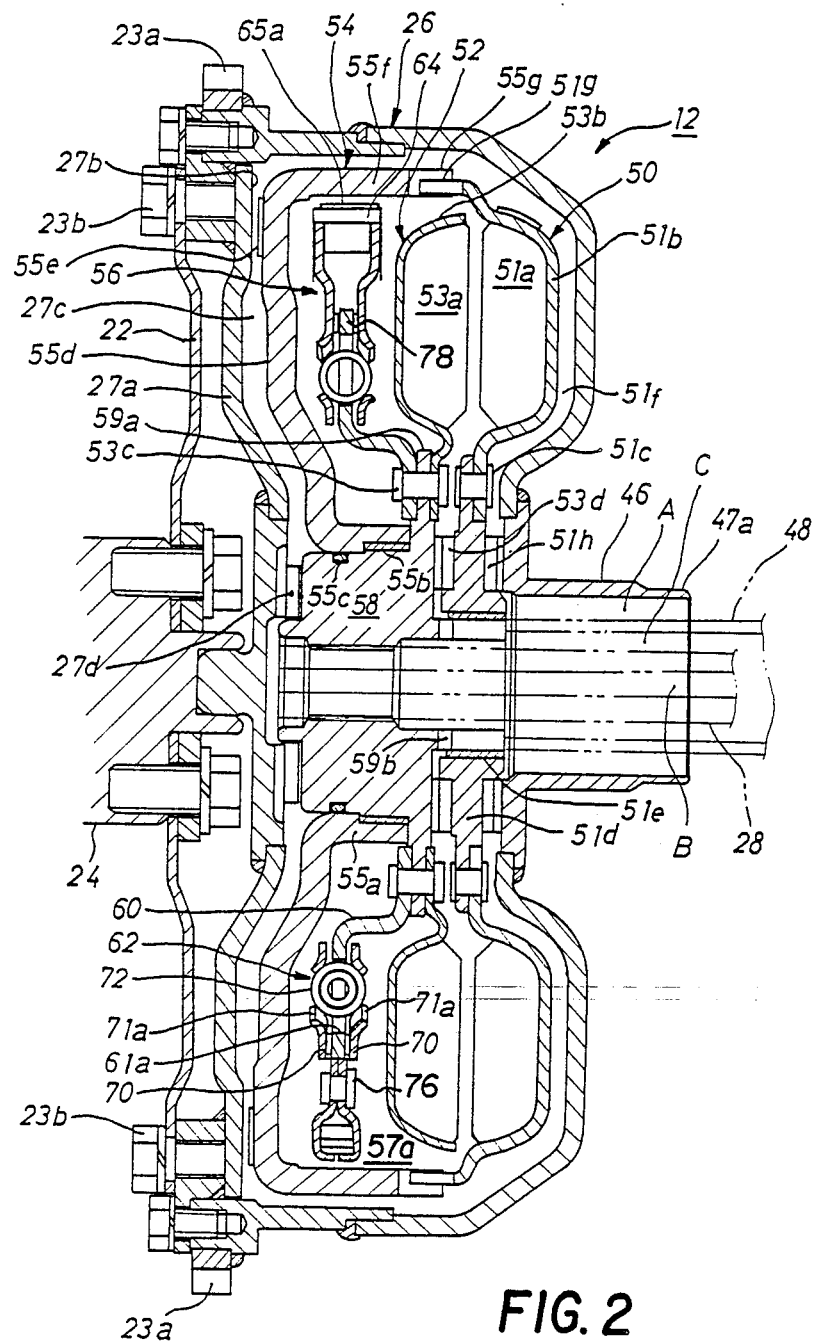
FIG. 2 is a vertical sectional view showing an acceleration clutch.

In FIG. 2, the external shell element 26 of the acceleration clutch 12 has an approximately annular cross section at its portion surrounding the output shaft 28. Drive plate 22 is fastened by the bolts 23b to a left end face in the figure to the external shell element 26. A cylindrical sleeve 46 is held to a right end portion of the external shell element 26, and an output section 47a driving gear pump 30 is formed on the sleeve 46. A cylindrical shaft 48 connected to the housing 10 is provided at an internal side of the sleeve 46, a working oil passage A is formed between an internal face of the sleeve 46 and the external face of the cylindrical shaft 48, and a working oil passage C is formed between an internal face of the cylindrical shaft 48 and an external face of the output shaft 28. These working oil passages A and are controlled to be opened and closed by the gear pump 30 and the not-shown well-known control valve (such as the spool valve etc.) as described above.

A pump wheel 50, a turbine wheel 52, a piston 4 (clutch element) and a centrifugal lock-up clutch 56 are housed in the external shell element 26.

The pump wheel 50 is composed of a pump vane 51a and a pump shell 51b, a radially inner periphery of the pump shell 51b is fastened by a rivet 51c to a pump hub 51d, and the pump hub 51d is rotatably supported through a bearing 51e to a turbine hub 58. A chamber 51f is formed between the pump shell 51b and the external shell element 26, and the chamber 51f is connected to the working oil passage A through a passage 51h.

The turbine wheel 52 is so disposed as to face on the pump wheel 50, and the turbine wheel is formed of a turbine vane 53a and a turbine shell 53b. A radially inner periphery of the turbine shell 53b is fastened by a rivet 53c to a right side face of a flange 59a of the turbine hub 58. A passage 53d is formed between the flange 59a and the pump hub 51d, and the passage 53d is connected to said working oil passage C through a passage 59b.

A freely slidable, approximately disc-like piston 54 is provided between an input section 27a of the external shell element 26 and the pump wheel 50. An inner peripheral flange 55a of the piston 54 is held axially slidably to an outer peripheral face of the turbine hub 58 through a bush 55b and an oil seal 55c. A facing 55e contacting with a contact face 27b of the input section 27a is lined on an end face 27d of the piston 54. An outer peripheral flange 55f of the piston 54 bends toward an outside of the pump wheel 50, and a dog tooth 55g of the outer peripheral flange 55f meshes with a dog tooth 51g of the pump shell 51b in such a manner that they are permitted to slide in the axial direction of the piston 54.

A chamber 27c is formed between the piston 54 and the input section 27a, and the chamber 27c is connected to the working oil passage B formed in the output shaft 28 through a passage 27d. The passage B is controlled to be opened and closed by gear pump 30 and the control valve.

The centrifugal lock-up clutch 56 is housed in a chamber 57a surrounded by the pump wheel 50 and the piston 54. The centrifugal lock-up clutch 56 consists of an output hub 60, damper mechanism 62, a clutch shoe 64 etc. therefor. Radially inner peripheral part of the output hub 60 is fastened together with the turbine shell 53b by the rivet 53c to a right end face of the turbine hub 58a.

The damper mechanism consists of a hole 61a of the output hub 60, holes 71a formed on two side plates and a torsion spring 72 compressively installed in between the holes 61a and 71a, having a function to absorb a torque fluctuation at the time of locking-up caused by the torsion spring 72.

The clutch shoe 64 which is freely contractible and expandible in its radial direction depending on a centrifugal force is provided at an outer peripheral edge of the side plate 70. A facing 65a contacting with an internal face of the outer peripheral flange 55f is lined on the clutch shoe 64.

Figure 3:
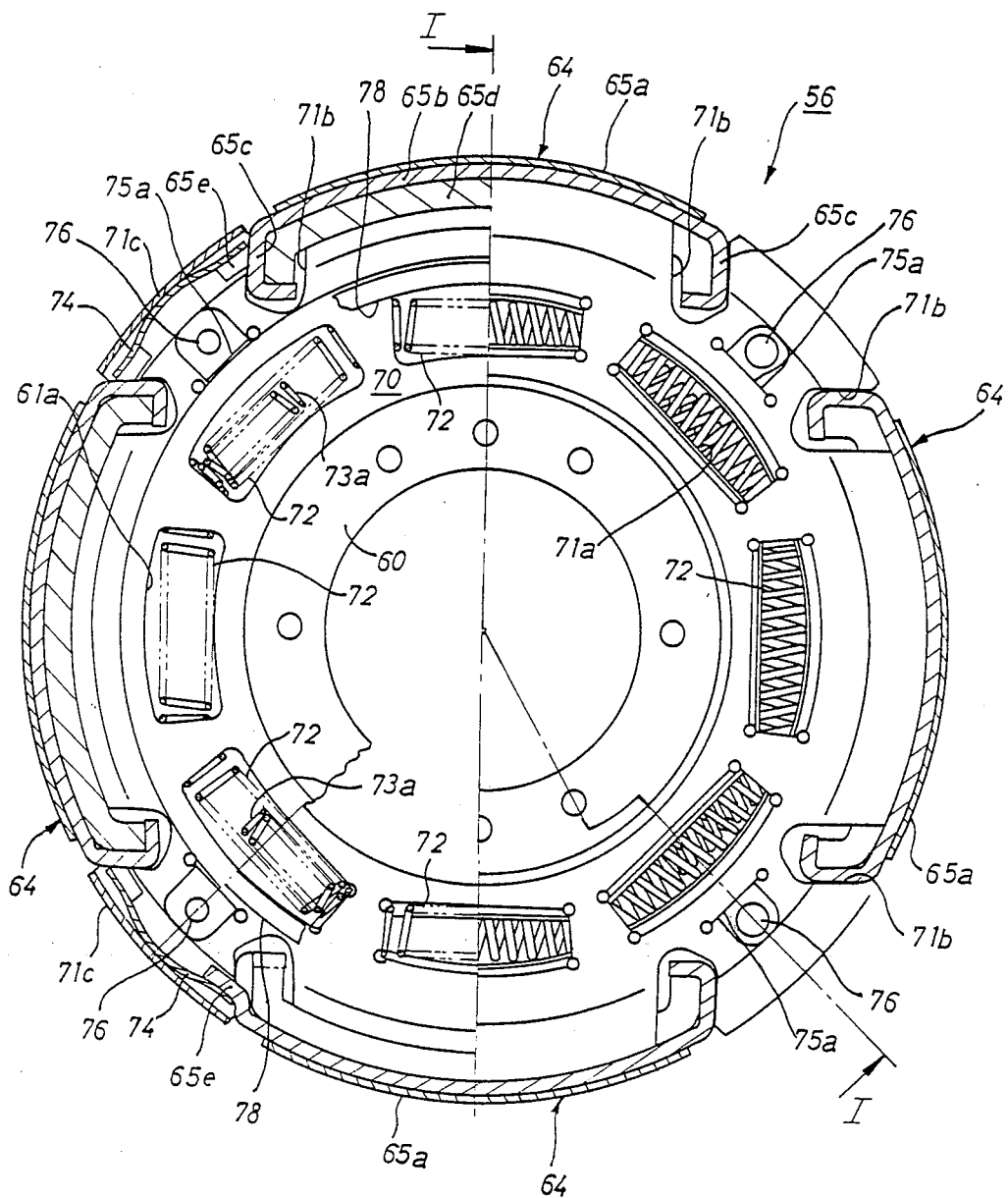
FIG. 3 is a plan view of a centrifugal lock-up clutch.

The torsion spring 72 is disposed, as shown in FIG. 3, at circumferential eight places for example with circumferentially equal spaces left therebetween. Torsion springs 73a of small diameter are disposed concentrically in every other torsion springs 72.

Further, the clutch shoes 64 are disposed on four places, for example, of a radially outer peripheral part of the side plate 70 with equal spaces left therebetween. The clutch shoe 64 is a member formed of an outer peripheral section 65b and a guide section 65c by bending a band steel plate, and a weight 65d is fitted integrally to its internal side by means of "crimp work" for example. The outer peripheral section 65b is formed into a circlar arc shape approximately consecutive to an outer peripheral edge of the side plate 70, and the facing 65a is lined on the outer peripheral section 65b. A projection 65e extending to a side direction is formed on the guide section 65c by means of a "press work" for example. The guide section 65c is held by a groove 71b of the side plate 70 in such a manner that it can freely slide in the radial direction of the side plate 70. Incidentally, the centrifugal lock-up clutch 56 of FIG. 1 shows a sectional view taken on a line I—I of FIG. 3.

A retaining portion 71c is formed on the side plate 70 between adjoining clutch shoes 64, a leaf spring 74 is compressively installed in between an internal face of the retaining portion 71c and a projection 65e, and a radial position of the clutch shoe 64 is determined by a spring force of the leaf spring 74.

A cut section 75a is provided on the side plate 70 at an internal side of the leaf spring 74, the side plate 70 is deformed starting from this cut section 75a by means of a press work etc. for example, and the side plates 70 are fastened with rivets 76 by making the two side plates 70 come closely into contact as shown in FIG. 2. The rivets 76 are provided at four circumferential places, for example.

Further, a wave spring 78 for generating a hysteresis torque is interposed between the output shaft 60 and the side plate 70.

Function will be described hereunder. Flows of working oil through the working oil passages A, B and C are changed by means of the gear pump 30 and the not-shown control valve through the driver's range-shifting operation, a difference is created in pressures between the chamber 57a and the chamber 27c to make the piston 54 slide in its axial direction, thus the power transmitted from the input portion 27a to the pump wheel 50 being selectively passed or interrupted. Namely, the power is transmitted to the pump wheel 50 when the piston 54 is switched to ON and facing 55e engaged with contact face 27b and it is not transmitted to the pump 50 when the piston 54 is switched to OFF and facing 55e is disengaged.

First, when the engine runs idle, the vehicle is stopped or the transmission is shifted to forward or backward; the working oil is pumped from the working oil passage B and discharged from the working oil passages A and C. Since a pressure in the chamber 27c becomes higher than a pressure in the chamber 57a under this state, a pressure difference between the chamber 27c and the chamber 57a makes the piston 54 slide toward the pump wheel 50 so that the facing 55e leaves the contact face 27b. Accordingly, the piston 54 is switched to OFF and a torque from engine is transmitted only to the external shell element 26 and the gear pump 30 so that a torque other than a slight drag torque is not transmitted to the output shaft 28.

Therefore, the generation of said creep phenomenon is securely avoided to eliminate possibilities of the unexpected sudden acceleration of vehicle during warm-up run and vibrations generated during idle run of engine.

Next, when accelerating the vehicle; the working oil is pumped from the working oil passage A and discharged from the working oil passage B through driver's range-shifting operation to D (drive) range or R (reverse) range. Since the pressure in the chamber 57a becomes higher than the pressure in the chamber 27c under this state, the piston slides toward the input portion 27a to make the facing 55e press on the contact face 27b.

Therefore, the piston 54 is switched to ON, the engine torque is transmitted from the external shell element 26 through the piston 54 to the pumping wheel 50, and further from the turbine wheel 52 to the output shaft 28. The power from the output shaft 28 is transmitted through the forward/backward change-over mechanism 14 to the stepless speed changer 16 and changed speed thereat, then transmitted to the axles 21b and 21c to cause the vehicle start.

As the vehicle is gradually accelerated; the turbine hub 58 increases its rotation speed, a centrifugal force applied on the weight 65d of the centrifugal lock-up clutch 56 is increased, the clutch shoe 64 move outward against the spring force of the leaf spring 74 due to the centrifugal force, and in a meanwhile the facing 65a of the clutch shoe 64 contacts with the internal face of the outer peripheral flange 55f to cause a so-called lock-up action.

Under this state the centrifugal lock-up clutch 56 contributes to the transmission of the engine torque, and the power inputted in the external shell element 26 is transmitted through two routes: a route through the pump wheel 50 and the turbine wheel 52 and a route through the centrifugal lock-up clutch 56.

When the vehicle speed rises further, the pressing force of the facing 65a on the outer peripheral flange 55f is increased, and in a meanwhile the piston 54 is coupled directly with the turbine hub 58 through the centrifugal lock-up clutch 56.

Under this state the engine torque is transmitted to the output shaft only by the centrifugal lock-up clutch 56 without passing through the pump wheel 50 and the turbine wheel 52.

Since the damper mechanism 62 is provided in the centrifugal lock-up clutch 56, shocks at the time of engaging and disengaging the centrifugal lock-up clutch 56 and torque fluctuation of engine are absorbed by the torsion spring 72 so that a ride-comfort of the vehicle can be maintained at a good level.

Effect of the Invention

As described above, in the stepless speed-change transmission for vehicle having the acceleration clutch comprising a fluid coupling, the forward/backward change-over mechanism coupled to the rear stage of the acceleration clutch, and the stepless speed changer coupled to the rear stage of the forward/backward change-over mechanism; the approximately disc-like output hub is connected to the turbine hub coupled to the turbine wheel of the fluid coupling fixed to the output shaft of said acceleration clutch, two side plates are so provided as to sandwich both side faces of the output hub, the damper mechanism is interposed between the side plate and the output hub, and the clutch shoe is provided at the outer peripheral portion of the side plate, which is movable in the radial direction of the side plate by means of the centrifugal force and can be freely engaged with or disengaged from the input member inputting the power from the engine. Therefore, the following advantages become obtainable.

At the time of high-speed drive wherein the turbine hub 58 rotates at high-speed; the centrifugal force exerted from the weight 65d to the clutch shoe 64 increases with an increase in the rotation speed, the pressing force which presses the facing 65a on the outer peripheral flange 55f increases with an increase in the rotation speed, the friction force produced at the facing 65a also increases, and the outer peripheral flange 55f is directly and completely coupled to the centrifugal lock-up clutch 56 at the time of high-speed.

Consequently, the possibility of producing the slip can be eliminated so that the present invention contributes to the improvement in fuel consumption of the power transmission equipped with the stepless speed changer 16 which requires no slip to be generated in the acceleration clutch 12.

Further, a torsional vibration caused by torque fluctuation of engine at the time when directly coupled can be absorbed by the torsion spring 72 of the damper mechanism 62, so that the ride-comfort can be improved.

Moreover, since the construction is simplified, the transmission can be fabricated at low cost and housed in the narrow acceleration clutch 12, so that the size of the acceleration clutch 12 can be minimized.

Another Embodiment (1) The clutch shoe 64 is not necessarily limited to the construction having the separate weight 65d, but the clutch shoe 64 may be formed integrally with the weight 65d by using sintered metal etc., for example.

(2) The input member on which the clutch shoe 64 presses is not necessarily the outer peripheral flange 65f of the piston 54, but may be another member such as, for example, the external shell element 26 on which the shoe may be directly pressed.

What is claimed is:

1. In a stepless speed-change power transmission for vehicle having an acceleration clutch comprising a fluid coupling, a forward/backward change-over mechanism coupled to a rear stage of the acceleration clutch, and a stepless speed changer coupled to a rear stage of the forward/backward change-over mechanism; a centrifugal lock-up clutch for the stepless speed-change power transmission for vehicle characterized by that an approximately disc-like output hub is connected to a turbine hub coupled to a turbine wheel of the fluid coupling fixed to an output shaft of said acceleration clutch, two side plates are so provided as to sandwich both side faces of the output hub, a damper mechanism is interposed between the side plates and the output hub, a clutch shoe is provided at an outer peripheral portion of the side plates with a leaf spring between said clutch shoe and said side plates, said clutch shoe being movable in a radial direction of said side plates by means of a centrifugal force applied to said clutch shoe and said leaf spring for freely engaging said clutch shoe with an input member inputting a power from an engine, said output hub being fastened together with a turbine wheel of the acceleration clutch by means of a rivet, said damper mechanism being formed of a hole in the output hub, two holes formed on the two side plates and a torsion spring compressively installed in between the both holes, said clutch shoe having an outer friction surface for engaging and disengaging said input member, said friction surface being mounted on a weight, said friction shoe being mounted for radial movement on said side plates by crimps at the opposite end of said weight beyond the ends of the friction surface, said leaf spring is compressively installed in between projection on the ends of said clutch shoe and said side plates, and a spring force of said leaf spring disengages said clutch shoe in a radial direction from said input member when said centrifugal force is removed.

* * * * *